US011100557B2

(12) United States Patent
Byron et al.

(10) Patent No.: US 11,100,557 B2
(45) Date of Patent: Aug. 24, 2021

(54) TRAVEL ITINERARY RECOMMENDATION ENGINE USING INFERRED INTERESTS AND SENTIMENTS

(71) Applicant: International Business Machines Corporation, Armonk, NY (US)

(72) Inventors: Donna K. Byron, Petersham, MA (US); Ashok Kumar, North Chelmsford, MA (US); Alexander Pikovsky, Lexington, MA (US); Mary D. Swift, Rochester, NY (US)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 14/532,796

(22) Filed: Nov. 4, 2014

(65) Prior Publication Data

US 2016/0125502 A1    May 5, 2016

(51) Int. Cl.
*G06Q 30/06*    (2012.01)
*G06Q 10/02*    (2012.01)
(Continued)

(52) U.S. Cl.
CPC ......... *G06Q 30/0631* (2013.01); *G06F 40/30* (2020.01); *G06Q 10/025* (2013.01); *G06Q 50/14* (2013.01)

(58) Field of Classification Search
CPC .. G06Q 30/0631; G06Q 10/025; G06Q 50/14; G06Q 40/30; G06F 17/2785
(Continued)

(56) References Cited

U.S. PATENT DOCUMENTS 5,692,212 A    11/1997  Gregory
5,987,415 A    11/1999  Breese
(Continued)

FOREIGN PATENT DOCUMENTS

WO    2004006546 A2    1/2004
WO    2008109485 A1    9/2008
(Continued)

OTHER PUBLICATIONS

Travel Ontology for Intelligent Recommendation System Published by Third Asia International Conference on Modelling & Simulation (Year: 2009).*
(Continued)

*Primary Examiner* — Jeff Zimmerman
*Assistant Examiner* — Zeina Elchanti
(74) *Attorney, Agent, or Firm* — David K. Mattheis; Maeve M. Carpenter

(57) ABSTRACT

Travel itineraries are automatically prepared based upon user interests and sentiments inferred by deep semantic analysis of user-commented and user-preferred digital works of literature by receiving interests and associated sentiment levels for at least one user according to a deep semantic analysis of a plurality of works of literature, wherein the works of literature have been rated, commented, or both rated and commented by the user; searching repositories of travel items to find one or more matching travel items to the received more interests and associated sentiment levels; and preparing at least one travel itinerary including at least one found matching travel item. Travel itineraries may be prepared responsive to a user-initiated trip planning session, responsive to notification of a new travel item's availability, periodically, or a combination thereof.

15 Claims, 7 Drawing Sheets

(51) Int. Cl.
*G06F 40/30* (2020.01)
*G06Q 50/14* (2012.01)

(58) Field of Classification Search
USPC .......................................................... 705/6
See application file for complete search history.

(56) References Cited

U.S. PATENT DOCUMENTS

| | | | |
|---|---|---|---|
| 6,003,070 A | 12/1999 | Frantz | |
| 6,064,980 A | 5/2000 | Jacobi | |
| 6,272,483 B1* | 8/2001 | Joslin | G06Q 10/06 706/62 |
| 6,289,342 B1 | 9/2001 | Lawrence | |
| 6,317,700 B1 | 11/2001 | Bagne | |
| 6,580,437 B1 | 6/2003 | Shih-Ping | |
| 6,711,465 B2 | 3/2004 | Robert | |
| 6,795,808 B1 | 9/2004 | Strubbe | |
| 6,874,123 B1 | 3/2005 | Francis | |
| 6,886,010 B2 | 4/2005 | Kostoff | |
| 6,901,399 B1 | 5/2005 | Corston et al. | |
| 7,058,567 B2 | 6/2006 | Ait-Mokhtar | |
| 7,115,297 B2 | 10/2006 | Jaffe | |
| 7,269,568 B2 | 9/2007 | Stiles et al. | |
| 7,493,190 B1 | 2/2009 | Robert | |
| 7,519,529 B1 | 4/2009 | Horvitz | |
| 7,716,161 B2 | 5/2010 | Dean | |
| 7,783,249 B2 | 8/2010 | Gary | |
| 7,788,084 B2 | 8/2010 | Caroline | |
| 8,200,688 B2 | 6/2012 | Messer et al. | |
| 8,306,921 B2 | 11/2012 | Kalik et al. | |
| 8,682,918 B2 | 3/2014 | Ramanujam | |
| 9,026,934 B1 | 5/2015 | Mehal | |
| 9,098,489 B2 | 8/2015 | Konstantin | |
| 9,153,089 B1 | 10/2015 | Hewett | |
| 9,298,802 B2 | 3/2016 | Allen et al. | |
| 9,535,899 B2 | 1/2017 | Allen et al. | |
| 9,535,901 B2 | 1/2017 | Orain | |
| 9,569,726 B2 | 2/2017 | Eric | |
| 9,613,098 B2 | 4/2017 | Allen et al. | |
| 9,916,564 B1 | 3/2018 | Johns et al. | |
| 9,946,978 B2 | 4/2018 | Francis | |
| 10,001,379 B2 | 6/2018 | Barker et al. | |
| 10,108,673 B2 | 10/2018 | Allen | |
| 10,120,908 B2 | 11/2018 | Allen | |
| 10,127,225 B2 | 11/2018 | Allen | |
| 2002/0010714 A1 | 1/2002 | Greg | |
| 2002/0022956 A1 | 2/2002 | Igor | |
| 2002/0026459 A1 | 2/2002 | Fernandez | |
| 2002/0103799 A1 | 8/2002 | Bradford | |
| 2002/0107742 A1 | 8/2002 | Breck | |
| 2002/0116176 A1 | 8/2002 | Valery | |
| 2002/0133347 A1 | 9/2002 | Eberhard | |
| 2002/0147619 A1 | 10/2002 | Floss et al. | |
| 2002/0165787 A1 | 11/2002 | Bates | |
| 2002/0184188 A1 | 12/2002 | Mandyam et al. | |
| 2003/0182123 A1 | 9/2003 | Shunji | |
| 2003/0225773 A1 | 12/2003 | Tor-Kristian | |
| 2003/0233225 A1 | 12/2003 | Bond | |
| 2004/0001086 A1 | 1/2004 | Brown | |
| 2004/0019484 A1 | 1/2004 | Kobayashi | |
| 2004/0249634 A1 | 12/2004 | Yoav | |
| 2004/0249791 A1 | 12/2004 | Waters | |
| 2004/0267600 A1 | 12/2004 | Horvitz | |
| 2005/0114399 A1 | 5/2005 | Masayuki | |
| 2005/0120015 A1 | 6/2005 | Marum Campos | |
| 2005/0165600 A1 | 7/2005 | Kasravi et al. | |
| 2005/0170945 A1 | 8/2005 | Stubbs | |
| 2005/0257400 A1 | 11/2005 | Ralph | |
| 2005/0273812 A1 | 12/2005 | Tetsuya | |
| 2005/0278164 A1 | 12/2005 | Hudson | |
| 2006/0053000 A1 | 3/2006 | Moldovan | |
| 2006/0064333 A1* | 3/2006 | Razza | G06Q 10/02 705/5 |
| 2006/0122807 A1 | 6/2006 | Wittkowski | |
| 2006/0143647 A1 | 6/2006 | Bill | |
| 2006/0235689 A1 | 10/2006 | Daigo | |
| 2006/0242180 A1 | 10/2006 | Graf | |
| 2007/0050374 A1 | 3/2007 | Zhao | |
| 2007/0050389 A1 | 3/2007 | Kim | |
| 2007/0112749 A1 | 5/2007 | Huang | |
| 2007/0150456 A1 | 6/2007 | Lian | |
| 2007/0185744 A1* | 8/2007 | Robertson | G06Q 10/02 705/5 |
| 2007/0204211 A1 | 8/2007 | Paxson | |
| 2007/0208545 A1 | 9/2007 | Wittkowski | |
| 2007/0214100 A1 | 9/2007 | Marfatia et al. | |
| 2007/0292826 A1 | 12/2007 | Goddy | |
| 2008/0133488 A1 | 6/2008 | Bandaru | |
| 2008/0227100 A1 | 9/2008 | Johnson | |
| 2008/0235576 A1 | 9/2008 | Bringsjord | |
| 2008/0249658 A1 | 10/2008 | Walker | |
| 2008/0256066 A1 | 10/2008 | Zuckerman | |
| 2009/0006397 A1 | 1/2009 | Lehtiniemi | |
| 2009/0063426 A1 | 3/2009 | Crouch | |
| 2009/0089047 A1 | 4/2009 | Pell | |
| 2009/0089133 A1 | 4/2009 | Johnson et al. | |
| 2009/0157714 A1 | 6/2009 | Stanton | |
| 2009/0234720 A1 | 9/2009 | George | |
| 2009/0240429 A1* | 9/2009 | Tanaka | G08G 1/096816 701/533 |
| 2009/0248399 A1 | 10/2009 | Au | |
| 2009/0276253 A1 | 11/2009 | Alspaugh | |
| 2010/0077001 A1 | 3/2010 | Vogel | |
| 2010/0100826 A1 | 4/2010 | Hawthorne | |
| 2010/0169803 A1 | 7/2010 | Mazzei | |
| 2010/0228693 A1 | 9/2010 | Dawson | |
| 2010/0235164 A1 | 9/2010 | Todhunter | |
| 2010/0235165 A1 | 9/2010 | Todhunter et al. | |
| 2010/0235465 A1 | 9/2010 | Thorpe | |
| 2010/0262454 A1 | 10/2010 | Sommer | |
| 2010/0312464 A1* | 12/2010 | Fitzgerald | G01C 21/343 701/532 |
| 2011/0066970 A1 | 3/2011 | Burrier | |
| 2011/0093417 A1 | 4/2011 | Nigam | |
| 2011/0093449 A1 | 4/2011 | Belenzon | |
| 2011/0110599 A1 | 5/2011 | Ichiko | |
| 2011/0141258 A1 | 6/2011 | Song | |
| 2011/0191212 A1 | 8/2011 | Iburg | |
| 2011/0270607 A1 | 11/2011 | Zuev | |
| 2012/0011139 A1 | 1/2012 | Drissi | |
| 2012/0072429 A1 | 3/2012 | Drissi | |
| 2012/0077178 A1 | 3/2012 | Bagchi | |
| 2012/0158172 A1 | 6/2012 | Wencslao | |
| 2012/0215347 A1 | 8/2012 | Illingworth | |
| 2012/0233253 A1 | 9/2012 | Ricci | |
| 2012/0239188 A1 | 9/2012 | Tomohiro | |
| 2012/0245923 A1 | 9/2012 | Brun | |
| 2012/0254333 A1 | 10/2012 | Chandramouli | |
| 2012/0265819 A1 | 10/2012 | McGann | |
| 2012/0284088 A1 | 11/2012 | Yokoyama | |
| 2012/0323725 A1 | 12/2012 | Johnston | |
| 2013/0024391 A1 | 1/2013 | Vakil | |
| 2013/0040556 A1 | 2/2013 | Robinson | |
| 2013/0054375 A1* | 2/2013 | Sy | G06Q 10/02 705/14.66 |
| 2013/0080169 A1 | 3/2013 | Harada | |
| 2013/0080471 A1 | 3/2013 | Forte | |
| 2013/0091130 A1 | 4/2013 | Barrow | |
| 2013/0096909 A1 | 4/2013 | Brun | |
| 2013/0166042 A1 | 6/2013 | Sharma | |
| 2013/0218914 A1 | 8/2013 | Stavrianou | |
| 2013/0275417 A1 | 10/2013 | Fernandes | |
| 2013/0346067 A1 | 12/2013 | Bhatt | |
| 2014/0074639 A1* | 3/2014 | Tian | G06Q 30/0631 705/26.1 |
| 2014/0079297 A1 | 3/2014 | Tadayon | |
| 2014/0114648 A1 | 4/2014 | Eggink | |
| 2014/0136323 A1* | 5/2014 | Zhang | G06Q 10/10 705/14.53 |
| 2014/0236573 A1 | 8/2014 | Allen | |
| 2014/0258301 A1 | 9/2014 | Misra | |
| 2014/0303774 A1 | 10/2014 | Schwarzli | |
| 2015/0154246 A1 | 6/2015 | Allen | |
| 2015/0154278 A1 | 6/2015 | Allen | |

(56) References Cited

U.S. PATENT DOCUMENTS

| | | | |
|---|---|---|---|
| 2015/0168150 A1* | 6/2015 | Kahn | G06F 16/29 |
| | | | 701/408 |
| 2016/0004766 A1 | 1/2016 | Danielyan | |
| 2016/0019741 A1 | 1/2016 | Dua | |
| 2016/0066970 A1 | 3/2016 | Graham | |
| 2019/0005097 A1 | 1/2019 | Allen | |
| 2019/0042626 A1 | 2/2019 | Allen | |
| 2019/0042646 A1 | 2/2019 | Hoang | |
| 2019/0065472 A1 | 2/2019 | Allen | |

FOREIGN PATENT DOCUMENTS

| | | |
|---|---|---|
| WO | WO2008109485 | 9/2008 |
| WO | 2009021198 | 2/2009 |

OTHER PUBLICATIONS

Long; "Towards Understanding Traveler Behavior in Location-Based Social Networks"; Retrieved from School of Information Sciences-University of Pittsburgh.

Mohammadnezhad; "An effective model for improving the quality of recommender systems in mobile e-tourism"; Retrieved from Department of Computer Science, Islamic Azad University, Shabestar branch,Shabestar, Iran.

IP.com; "Enhancing Text to Speech by User Context and Preferences"; Retrieved from IP.com; IP No. IPCOM000232293D.

IP.com; "Method for Communicating Information to and for Traveling Users"; Retrieved from IP.com; IP No. IPCOM000111043D.

IBM, "List of Co-Assigned Patent Applications to be Treated as Related", filed in the present patent application.

USPTO; first office action dated Aug. 25, 2015 in related U.S. Appl. No. 14/094,934, filed Dec. 3, 2013 by Corville O. Allen, et al.

IP.com; "Method for Communicating Information to and from Traveling Users", disclosure No. IPCOM000111043D, Fitzpatrick, et al., Feb. 1, 1994.

IP.com; "Enhancing Text to Speech by User Context and Preferences", disclosure No. IPCOM000232293D, Anonymous, Oct. 30, 2013.

Long, Xuelian, et al.; "Towards understanding traveler behavior in location-based social networks"; Jun. 12, 2014, from http://ieeexplore.ieee.org/document/6831561.

Mohammadnezhad, Masoumeh, et al.; "An effective model for improving the quality of recommender systems in mobile e-tourism"; Feb. 2012, Int'l Journal of Computer Sc. & Information Tech.; vol. 4, No. 1.

McCarty, L. Thorne, "Deep Semantic Interpretations of Legal Texts",retrieved on Nov. 27, 2012 from http://remus.rutgers.edu/cs440/icail07-acm.pdf.

Guarino, L.R., et al; "The Evolution of Abstraction in Programming Languages"; document No. IPCOM000148048D, published on May 22, 1978; retrieved from www.IP.com.

Meeson, R. N. Jr., et al; IP.com; "An Evaluation of Data Abstraction for Software Modification"; document No. IPCOM000151064D, published on May 31, 1980; retrieved from www.IP.com.

Wikipedia; "Smith-Waterman algorithm"; retrieved from http://en.wikipedia.org/wiki/Smith-Waterman_algorithm on Feb. 5, 2013.

Maggiani, R.; "Method for Customizing Queries Based on User Preferences for Searching Online Content and Returning Customized Results"; published by IP.com, Feb. 10, 2009.

Anonymous; "Method and Apparatus for User Authentication Based on Dynamic Question-Answer Generation from Social Networks Data"; published by IP.com, Mar. 19, 2012.

Ferrucci, D.; "Building Watson; An Overview of the DeepQA Project"; retrieved on Nov. 11, 2011 from http://www.stanford.edu/class/cs124/AIMagzine-DeepQA.pdf.

IBM; "High Throughput Computing on IBM's Blue Gene/P".

IBM; "IBM System Blue Gene/P Solution".

IBMResearch; "DeepQA Project FAQ's"; retrieved on Sep. 13, 2011 from http://www.research.ibm.com/deepqa/faq.shtml.

IBMResearch; "Unstructured Information Management Architecture (UIMA)"; retrieved on Oct. 19, 2011 from http://domino.research.ibm.com.

Allen, James F., et al., "Deep Semantic Analysis of Text", retrieved on Oct. 27, 2012 from http://aclweb.org/anthology-new/W/W08/W08-2227.pdf.

Wikipedia; "Deep linguistic processing", especially the section entitled "Contrast to 'shallow linguistic processing'", retrieved from https://en.wikipedia.org on Apr. 27, 2018.

Wotzlaw, et al.; "Recognizing Textual Entailment with Deep-Shallow Semantic Analysis and Logical Inference", SEMAPRO 2010: The Fourth International Conference on Advances in Semantic Processing, copyright 2010 by IARIA, ISBN: 978-1-61208-104-5.

Goodfellow, et al.: "Deep Learning", MIT Press, published Nov. 18, 2016. Chapter 19, retrieved on Aug. 13, 2018 from https://www.deeplearningbook.org/.

NVIDIA; "Technial Overview: NVIDIA Deep Learning Platform". retrieved on Aug. 13, 2018 from https://www.nvidia.com/en-us/deep-learning-ai/solutions/inference-platform/.

Park et al: °Scalable Deep Learning/Inference Processor with Tetra-parallel MIMD Architecture for Big-data Applications; Abstract. IEEE Xplore; retrieved on Aug. 13, 2018 from h.

IBM; "List of Co-Assigned Patent Applications to Be Treated As Related".

AIT-MOKHTAR; "Robustness beyond Shallowness: Incremental Deep Parsing"; Retrieved on Aug. 28, 2013 from <http://pageperso.lif.univ-mrs.fr/~edouard.thiel/RESP/Semi/2006/ROUX/idp.pdf>.

Declerck et al., "Linguistic and Semantic Representation of the Thompson's Motif-Index of Folk-Literature", Research and Advanced Technology for Digital Libraries, International Conference on Theory and Practice of Digital braries, TPDL2011, Sep. 26-28, 2011, pp. 151-158.

Disclosed Anonymously, "Enhancing Text To Speech by User Context and Preferences"; IP.com Prior Art Database Technical Disclosure, IP.com No. IPCOM000232293D, Electronic Publication Dale; Oct. 30, 2013.

Disclosed Anonymously, Method to extract simple and compound terms from text corpuses {without performing full semantic analysis), IP.com Prior Art Database Technical Disclosure, IP.com No. PCOM000220204D, IP.com Electronic Publication: Jul. 25, 2012, 6 pages.

IBM, "A Method of Using Electronic Perpetual Vending Machine Operational Data to Detect Operational Problems with Vending Machines Networked Together via Either Wireless or Telephone Lines to a Managed Operations Central Server Environment and Notification of Problems via Electronic Means, Wireless Means, email Means, Pager Means, or Other Individually Addressable Device Means", IPCOM000015112D, Jun. 20, 2003.

IBM, "Automatically Applying Constructs to Form Elements based on Semantic Analysis of the bound XML Instance Elements", IP.com Prior Art Database Technical Disclosure, IP.com No. IPCOM000152210D, IP.com Electronic Publication: Apr. 26, 2007, pp. 1-7.

IBM, "Method for Communicating Information to and for Traveling Users", IP.com Prior Art Database Technical Disclosure, IP.com No. IPCOM000111043D, IP.com Electronic Publication: Mar. 26, 2005, 5 pages.

IBM; "Vending machine management system", IPCOM000127333D, Aug. 24, 2005.

Kasavana, "V-Commerce: Understanding Vending Machine Technology", retrieved on May 8, 2014 from <http:// www. hospitalitynet.org/news/401 1592-html>.

Linkspringer; "Linguistic and Semantic Representation of the Thompson's Motif-Index and Folk-Literature" Retrieved on Aug. 28, 2013 from <http://link.springer.com/chapter/10.1007/978-3-642-24469-8_17>.

NBCNews; "Smart Vending Machine Scans Your Face to Serve Up Snacks"; Mar. 5, 2014; retrieved from <http://nbcnews.com>.

NTC's Dictionary of Literary Terms;" To The User" section; McGraw-Hill publishers, 1998.

(56) References Cited

OTHER PUBLICATIONS

Redbox, "What should I do if the box is out of service or full, and it won't accept my movie?", retrieved on Apr. 25, 2014 from <https://redbox.custhelp.com/app/answers/>.
Redbox; "How does your billing process work?", retrieved on Apr. 25, 2014 from <https://redbox-custhelp.com/app/howto/aid2/623>.
Ross, Jr., "Computer-Aided Study of Literary Language", IP.com Prior Art Database Technical Disclosure, IP.com No. IPCOM000131345D, Original Publication Date: Aug. 1, 1978, Original Disclosure Information: IEEE Computer, vol. 11, No. 8, pp. 38-39.
Wikipedia, "Abstraction-Filtration-Comparison Test", retrieved on Jun. 10, 2015 from <http://en.wikipedia.org/wiki/Abstraction-Fillration-Comparison_test>.
Wikipedia; "Cluster Analysis";Retrieved on May 15, 2013 from <http://en.wikipedia.org/wiki/Cluster_analysis>.
Ferrucci, et al., "Building Watson: An Overview of the DeepQA Project", retrieved on Nov. 11, 2011, 21 pps., from <http://www.stanford.edu/class/cs 124/AIMagzine-DeepQA.pdf>.
"Method and Apparatus for User Authentication Based on Dynamic Question-Answer Generation from Social Networks Data", IP.com No. IPCOM000216026D, IP.com Electronic Publication Date: Mar. 19, 2012, 4 pps.
IBM Research; "The DeepQA Research Team" (prior title: "DeepQA Project FAQ's"), IBM, last updated Dec. 12, 2016, 2 pps., from <.https://researcher.watson.IBM.com/researcher/view_group.php?id-2099> (previous link was: <http://www.research.ibm.com/deepqalfaq.shtml>).
Wilcock, "Unstructured Information Management Architecture (UIMA)", University of Helsinki, retrieved on Oct. 19, 2011, University of Helsinki, IBM Research, 56 pps., <http://domino-research.ibm.com>.
Sosa et al., "IBM System Blue Gene Solution: Blue Gene/P Application Development", (prior title "IBM System Blue Gene/P Solution"), Redbooks, IBM, Aug. 2009, 406 pps., <http://www.redbooks.IBM.com/abstracts/sg247287.html? Open>.
Budnik, et al., "High Throughput Computing on IBM's Blue Gene/P", IBM, IBM Rochester Blue Gene Development, downloaded from the Internet on Mar. 5, 2021, 18 pps., <https://www.ibm.com/downloads/cas/YWRKNZXQ>.
Maggiani, R.; "Method for Customizing Queries Based on User Preferences for Searching Online Content and Returning Customized Results", Original Publication Date: Feb. 10, 2009, IP.com No. IPCOM000179234D, IP.com Electronic Publication Date: Feb. 10, 2009, 7 pps.

\* cited by examiner

TRAVEL ITINERARY RECOMMENDATION ENGINE USING INFERRED INTERESTS AND SENTIMENTS

INCORPORATION BY REFERENCE

Co-assigned and co-pending U.S. patent application Ser. No. 13/722,017, filed on Feb. 20, 2013, and co-assigned and co-pending U.S. patent application Ser. No. 14/094,943, filed on Mar. 15, 2013, both by inventors Corvine O. Allen, et al., are hereby incorporated by reference in their entireties.

FIELD OF THE INVENTION

This invention relates generally to methods and processes for inferentially determining travel interests and sentiments within unstructured natural language text, and for using those interests and sentiments to prepare potential travel itineraries.

BACKGROUND OF INVENTION

The space of online travel bookings, when viewed as technology optimized for delivering information to users for browsing so that they can select a travel destination and arrival/departure details, continues to expand and is a high-value opportunity for cognitive lifestyle computer applications. One challenge in this space is in gathering information about the traveler in order to personalize the recommended destinations to be places or activities of interest, or to support selling of additional travel activities to an existing itinerary.

Current online travel information browsing methods rely on standard recommendation engine techniques that utilize within-site information (recommending based on similarity to other travelers (collaborative filtering), or based on past purchase history by a user or other users within the site. For example, a travel planning web site often shows "most popular", which may mean that more users have looked at or bought this travel item, more users have given this item a high satisfaction rating, or that the purveyor of the travel web site wishes to sell more of this travel item.

Additionally, travel recommendation engines sometimes use personality attribute questionnaires, although such self-assessments are tiresome to be completed by the user. Based on the user's answer to these question, travel items related to these answers may be suggested, or these answer may be matched against a traveler profile which is then matched to travel items to suggest.

SUMMARY OF THE INVENTION

Travel itineraries are automatically prepared based upon user interests and sentiments inferred by deep semantic analysis of user-commented and user-preferred digital works of literature by receiving interests and associated sentiment levels for at least one user according to a deep semantic analysis of a plurality of works of literature, wherein the works of literature have been rated, commented, or both rated and commented by the user; searching repositories of travel items to find one or more matching travel items to the received more interests and associated sentiment levels; and preparing at least one travel itinerary including at least one found matching travel item. Travel itineraries may be prepared responsive to a user-initiated trip planning session, responsive to notification of a new travel item's availability, periodically, or a combination thereof.

BRIEF DESCRIPTION OF THE DRAWINGS

The figures presented herein, when considered in light of this description, form a complete disclosure of one or more embodiments of the invention, wherein like reference numbers in the figures represent similar or same elements or steps.

DETAILED DESCRIPTION OF EMBODIMENT(S) OF THE INVENTION

Figure 1:
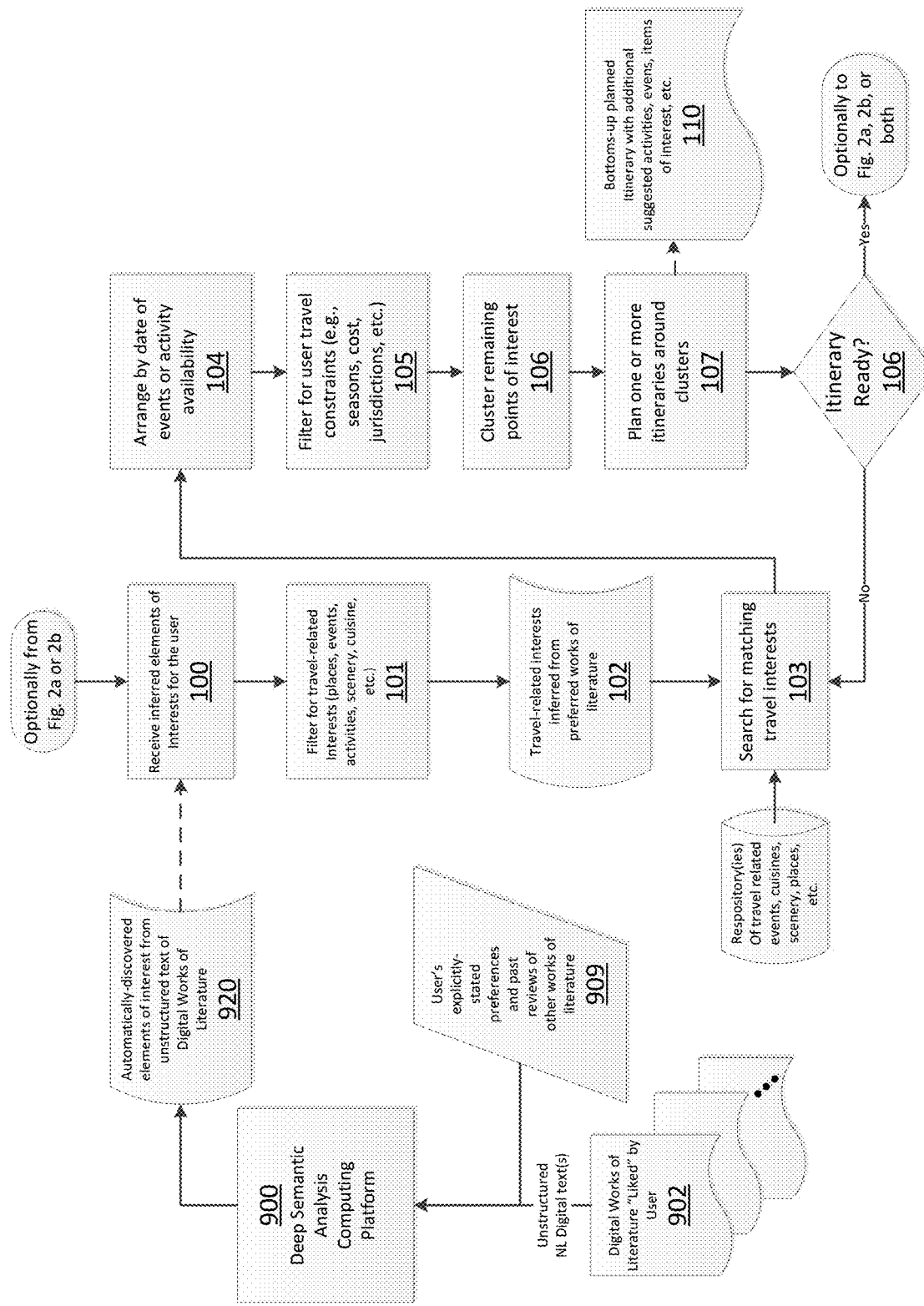
FIG. 1 sets forth an exemplary logical process for generating a travel itinerary in a bottoms-up, micro-decisions-first paradigm using user interests and sentiments as seeds to the process.

Travel recommendation engines are difficult to design because the space of possible trips and travel items within the trips is so vast and fluid. For example, some interesting events always occur, without fail, about the same time every year, while other event occur only once in each locale. Any information that can be used to prune or score alternatives will greatly improve the user's experience.

The present inventors have recognized that the paradigm of creating an online travel itinerary by a user is generally a top-down approach or macro-decision-first approach. It begins with a main destination travel item, such as travelling to a particular city on vacation or to attend a conference. The user then searches for flights or trains to get there, with a preferred arrival and departure date and time. If the user discovers other interesting things to do while there, it can be a matter of luck to discover these things.

There is little or no way, using this paradigm, to easily know if extending a trip by a few days or arriving a few days early may result in being at the destination when another very interesting even might be going on. This results is lower traveler satisfaction, and lost revenue for the hotels, restaurants, and venues.

The present inventors have developed a bottoms-up or micro-decisions-first paradigm for planning a travel itinerary. Using new deep inferential searching techniques, user interests and sentiments are inferred from a unique source of information, and then potentially interesting travel items are found, Next, possible itineraries are constructed and planned, which are then proposed to the user. By starting with these micro-decisions which are associated with strong sentiments of interest, the traveler's interests are considered first, and the result is greater traveler satisfaction as well as additional nights of stay at hotels, venue ticket income, and the like.

Embodiments of the present invention engage and use a novel source of user interests and sentiment data, instead of or in addition to the aforementioned user interest information available to present-day systems.

Based on this unique source of information, embodiments of the present invention find potentially interesting travel items (e.g. events, activities, points of interests, museums, exhibits, performances, etc.) in which a user has implicitly shown positive strong sentiment, as well as optionally finds travel items to be avoided due to strong negative sentiments. Using these matched travel items, one or more travel itineraries are created (or modified) to include the positively-associated items and to optionally avoid or exclude the negatively-associated items.

Thus, using the this new technology to employ a new travel planning paradigm instead of or in conjunction with current travel planning techniques, a travel website and/or server can recommend both the micro- and macro-elements of a hypothetical trip. In fact, the macro-elements can be constrained due to a particular user's strong interest in particular micro-level activities, e.g., a military history buff who has never visited Gettysburg or Verdun might be sent there for this year's vacation, or an avid gardener who's never been to the Portland Rose Garden may be suggested a visit to the U.S. Pacific northwest region.

As such, embodiments of the current invention include computer-implemented methods to collect travel-relevant personalization attributes by aggregating the a traveler user's sentiments about travel items such as places, activities, and cuisine from online review and ratings sites, for use in creating personalized travel destination and activity recommendations. These attributes are used to identify locations/activities of interest and also to construct proposed travel scenarios customized to the user's interests. For example, such a system may recommend a trip for one particular user that visits places mentioned frequently in online visits or movies that this person liked (e.g., user rates movies about Italy as high rating, so they are recommended a trip to Italy), or such a system may recommend a trip that emulates elements from user-preferred literary narratives (e.g., an avid fan of Downton Abbey may be suggested similar castles and countryside excursions while visiting England). Still further, if a user rates movies with car chase element highly, such as system may discover this and recommend a trip where he or she can view Formula1 race, go to a museum of racecars (e.g., Daytona speedway), drive a performance car on a closed course, or take a F1 car driving lesson.

Unique Source of User Interest and Sentiment Information

The present inventors, as alluded to in the foregoing paragraphs, have discovered that many user interests and sentiments can be discovered through information gleaned from works of prose that the user has "liked" or reviewed. For example, a user may have posted to a social media account that he or she likes several books and movies as well as made negative comments about other books and movies. Rather than ask the user what he or she liked and disliked about these works of literature, the present inventors utilize a deep semantic analysis engine to discover similarities between the liked and disliked literary items. These may be interests which the user could not articulate, if asked, about himself or herself because he or she is not even aware of these sentiments. For example, if a user likes a lot of science fiction, especially space travel, literature, he or she may not even realize how much they would enjoy a trip to see a rocket manufacturing plant, a launch site, or a museum about the history of space exploration. And, if this user has disliked many works of literature that deals with war, it can be inferred through deep semantic analysis that visits to war memorials should be avoided on a vacation.

For the purposes of the present disclosure, we will refer to "works of prose" and "works of literature" interchangeably to include text, especially electronic text, which is recorded and expressed in unstructured, natural language format, such as but not limited to books, movies, computer games, news stories, online blogs, social media positing and comments, travelogues, music lyrics, magazines, news websites, reference websites, product descriptions, catalog descriptions, auction descriptions of items for bidding, and other narrative information or cultural information units.

Works of literature, such as novels, short stories, movies, and songs contain complex relationships between their elements such as the organization of information, the relationship between the characters presented in the literature, and a plot line within the work of literature. Every user or consumer of such information has sentiments, strong or weak, positive or negative, about those elements as well as about the work as an entirety.

For works which are more narrative in nature, such as novels short stories, and movies, the plot is a story line which is populated not only with characters and their interactions, but also with information such as natural events, descriptions of scenery, as well as elements such as humor, mystery, suspense, drama, action, struggles, birth, death, betrayal, etc. All of these types of works of literature can be viewed in segments, such as chapters, or even just in blocks of literature such as page ranges.

As a consumer, whether an avid novel reader or a professional or student using a reference book, one becomes aware of one's preferred content and presentation sequence. For this reason, there is a vast array of novel writing styles, movie styles, etc.

Most consumers of literature have a preference of the type and format of books they read, enjoy and find most useful. These preferences are usually reflected in certain characteristics that are common among all of their preferred works of literature, and the flows of content within each of these are usually highly similar to each other.

For example, how funny and what types of humor used in a work of literature can be one key category of literary element that a particular person prefers. Other consumers may prefer a mixture of adventure and suspense, or they may prefer adventure with exploration, rather than adventure with action. In some circles, the broad adventure genre would not be enough to determine whether someone would like a book.

As such, the present embodiments of the invention described herein rely upon enabling technology of deep semantic analysis computing platforms and services. As an application of such technology, embodiments of the invention may utilize such technology from a variety of sources. One such available sources is the IBM Watson deep semantic analysis system, which is described in the following section on such a system. It should be recognized, however, that the present invention may be realized with other deep semantic analysis services and platforms with beneficial results.

Top-level Description of Micro-Decision Travel Itinerary Planning

As previously stated, existing travel planning systems rely on collecting user attributes through either questionnaires and personality surveys via social network attributes using collaborative filtering, or via past browsing/search query history (e.g. 'similar products'). Typical recommendation engine techniques have a shallow view of each user's interests, based on their interaction internal to the travel/product website. This method has a richer view of user interests as implied by their affinity for activities/places/foods within books, movies, and other cultural communications. Alternatively, existing systems which recommend travel activities and destinations based on user questionnaires can seem unnatural, and the questionnaires are cumbersome to complete.

Travel planning engines according to the present invention may provide two kinds of service. First, they may exist as a user-initiated, interactive planning tool. Second, they may exist as an advertising or promotion service which proactively, without user initiation, finds interesting travel items, prepares example itineraries, and notifies users accordingly. Other hybrid models are also possible, according to the present invention.

Such embodiments of the invention assume access to one or more sources of information that have been populated via existing techniques (see deep semantic analysis section herein):

(1) The user's ratings and reviews of books, movies, computer games, news stories, online blogs, travelogue posts, music and any other narrative information or cultural information unit. Ratings are expected to use some scalar value, such as a 1-5 star rating. Reviews may include unstructured text and can be mined for sentiment using enabling art from the literature. Books and movies that the user indicates positive sentiment for can be analyzed for literary elements using enabling art, such as described in U.S. Pat. Nos. 9,535,899 and 9,298,802 both of which were commonlhy assigned with the present invention. Specific localized individual 'likes' from social networks can also be used if available, for example, the user 'likes' a friend's post about visiting the Carriage Museum in Vienna.

(2) The user's online web visit history such as bookmarks for international museum websites or frequency of visits to military history sites.

(3) Textual information describing the content of each cultural unit (i.e. media such as movies or music, textual sources such as books and blogs). This can be a combination of structured and unstructured information including but not limited to:

descriptions of the action, such as the Wikipedia entry for a movie or Internet Movie Database (IMDB) description plus online reviews, literary reviews, librettos, and other summaries; and subtitle information for movies (subtitles include not only dialogue text but also meta-data such as location and descriptions of scenes).

(4) An inventory of factors that are relevant to travel destinations and personal interests. Tags in this inventory can be location names (e.g., Italy, Africa, Venice Beach), location types (e.g. beach, tropical, capital, countryside), activities (e.g., horseback riding, war, archeological dig, nightclub), and historical period (e.g. Edwardian, ancient Rome, Tokugawa), etc. This inventory of tags can be manually created or induced from travel corpora. The items that are available for populating into travel itineraries (destinations and local activities) are associated with tags from this inventory. For example, a museum of military objects in Paris would be tagged with its location, war, tags for each historical period of the objects in its collection, and tags for potential famous historical figures (e.g. Napoleon, Charles the First).

An example, generalized logical process using movie reviews as a source of user interest and sentiment information may proceed as follows:

(1) Crawl and populate a collection of items the user has rated/reviewed, frequently visited, liked on social media, etc. Store the user's own ratings/reviews and also supporting information (listed above) about each movie.

(2) Analyze each movie and extract a list of travel-relevant features. All attributes of a movie may not be relevant for leisure-time activities. For example, the main character in a movie is a plumber (not relevant to travel) vs. the main character is a barkeeper in Hawaii (relevant to travel). Therefore, the extracted features of the movies/books come from the prepared inventory of travel-relevant features mentioned above. Examples of features that have some relevance to possible vacation activities:

locations included in the movie;

local attractions for these locations;

activities portrayed in the movie such as casino, race track, theme park, beach;

food items eaten/prepared, general type of cuisine, especially associated with a location; and hobbies and professions of characters in the film, such as cowboy, racecar driver, astronaut, farmer.

(3) Transfer user sentiment from the user's ratings/reviews to each extracted feature. For each movie, associate the user's calculated sentiment toward that movie with the feature vector from the movie produced in step (1). If possible, if the user has commented on individual attributes as good or bad, rate those individual features. So, for example, this would produce a positive sentiment score for Italy, Italian cuisine, Rome, riding a Vespa scooter, etc.

(4) Find travel activities that match items with positive sentiment.

(5) Calculate similarity between the user's positively rated factors and travel/tour activities and destinations. This can be done in a variety of ways, for example using a grid in which each possible tag from the tag inventory is a row, and the target user's attributes are populated along one column of the matrix, with each travel destination also populated as a column. For each column, the affinity with the feature in each row is represented as a numeric value. The similarity between the user and each travel destination can then be calculated using techniques similar to document similarity comparisons (cosine vector distance).

In one example embodiment, once the items of potential interest to the user are identified, the system then builds a complete travel itinerary including those items. This relies on gathering additional constraints from the user, such as time of year and duration of the trip, and budget. Using a sequence constructor such as plan-based reasoning, various possible trips are constructed. For the purposes of the present disclosure, a complete travel itinerary shall refer to not just a single recommended travel item, but shall refer to a computer container representation of a portion of a trip which includes multiple travel items, such as transportation travel items (air, train, car, bus, ferry, etc.) associated with venues and tickets to a destination city or area at a particular calendar time. While some travel itineraries may not include transportation, such as "staycations" which are near the user's home, it still includes multiple travel items within a digital container bounded by a travel condition (e.g., a holiday weekend, a school break, etc.)

Recommended trips are evaluated in the system (scored) based on the total sentiment value for the items they incorporate (i.e. an itinerary that incorporates multiple military history venues would accumulate positive sentiment congruent with the sum of sentiment on those activities). It is likely that any particular person will have an affinity to many travel destinations/activities. There may be no one best trip for a particular traveler. Moreover, there may be many different personal interests that could be used to propose a satisfying trip. Therefore, this method utilizes randomization with restarts. The trip construction process is seeded with a particular destination/activity with high affinity, and that initial seed is used as the starting point of trip construction. The process is then restarted with a different seed. This results in a variety of unique and varying alternative itineraries for the user.

Examples of trips that might be proposed with certain travel items as part of a complete travel itinerary:

- someone who frequently reads/likes textile arts and crafts such as knitting and batik websites would be recommended a complete itinerary including a visit to the textile museum in Washington D.C., or an itinerary including a visit to the Manufacture des Gobelins tapestry factory located in Paris, France, or including a trip to Morocco to buy artisan-made rugs;
- someone who frequently reads gardening books and visits garden websites is proposed an full travel itinerary travel items such as a garden tour, farm visits, taking a garden design course, driving around Holland and seeing the tulip fields, etc.;
- someone who rates "City Slickers" as their favorite movie ever, is recommended a travel itinerary featuring, among other travel items, a stay in a dude ranch and a driving tour through Abiqui, N. Mex.;
- someone who frequently watches action films with car chase sequences is suggested a full travel itinerary including taking a NASCAR™ or Formula1 racing lesson or bootcamp among other travel items; and
- someone who reads everything written by and about Hemingway is recommended a complete travel itinerary which includes, among other travel items, a visit to Hemingway's birthplace museum in the Chicago, Ill., area.

Such computer-implemented methods can be extended to families or social groups by including interests of the whole family/group, perhaps with some wiighting and specifically looking for scenarios attractive to more than one member of the family.

As such, various embodiments according to the present invention provide a number of novel and useful improvements over the art in trip planning, including but not limited to:

- User preferences are collected from various media and applied to recommendations in a completely different domain (travel). This is distinct from other recommendation engines that primarily collect user preferences for a specific article, such as clothing, to generate recommendations for other items of clothing.
- This method does not require collecting many observations of user history within the travel suggestions site. Other methods that utilize search query terms work best only after the user has spent significant time on the site.
- This method uses content-based recommendations, using a deep natural language processing (NLP) analysis of the text of content items, unlike other travel recommendation engines.
- Positive sentiment accrues to individual granular items in the travel activities database based on the user's interest (individual museums, monuments, wilderness areas, cultural regions, classes, etc.) and then the engine builds a composite trip itinerary based on the score of spatially-contiguous elements. A key unique point here is that what is proposed for the traveler is a composite product (analogous to a shopping cart) rather than an individual item.
- The method is specific to travel recommendations and might not be applicable as a general purpose recommendation engine.
- Beyond just semantic concept-based matching (knitting=fabric arts), there are many other dimensions of travel preferences that can be gleaned from cultural containers that are not found via other means, such as activity level (action vs. passive), setting (urban vs rural), etc.

DETAILED EXAMPLES OF EMBODIMENTS

Itinerary Generation. Referring now to FIG. 1, a logical process according to the invention to generate an itinerary based on inferred user interests and sentiments is shown. A deep sematic analysis system (900), such as the IBM Watson system described in further detail in following paragraphs, analyzes unstructured data (books, magazines, movie scripts) (902) and optionally combines explicit expressions of user preferences (909) to create a record of interests and sentiments (920) for a particular user. Optionally, interests and sentiments for a group of users can be aggregated, and a record created for that group, as well. This information is received (100) by the embodiment of the present invention, and it is filtered (101) for travel-related interests and sentiments, such as selection of destinations, events, cuisine, activities, etc., which correlate to things that can be done or experienced by a traveler.

Next, the resulting filtered interests and sentiments (102) are used to search (103) one or more repositories of travel related items, such as destinations, events, cuisine, activities, venues, exhibitions, points of interest, etc. The search results are arranged by dates of the items, and filtered (105) for other user constraints such as seasons, costs, jurisdictions, etc.

The date-ordered, constraint-filtered travel items are then clustered, i.e., grouped according to ability to cover in a single trip or vacation, and transferred to a bottoms-up itinerary trip planning system (107) to yield one or more itineraries.

If no itinerary results from this pass of the method, then it is repeated (103-106) for a different set of available travel items, constraints, and preferences.

Figure 2A:
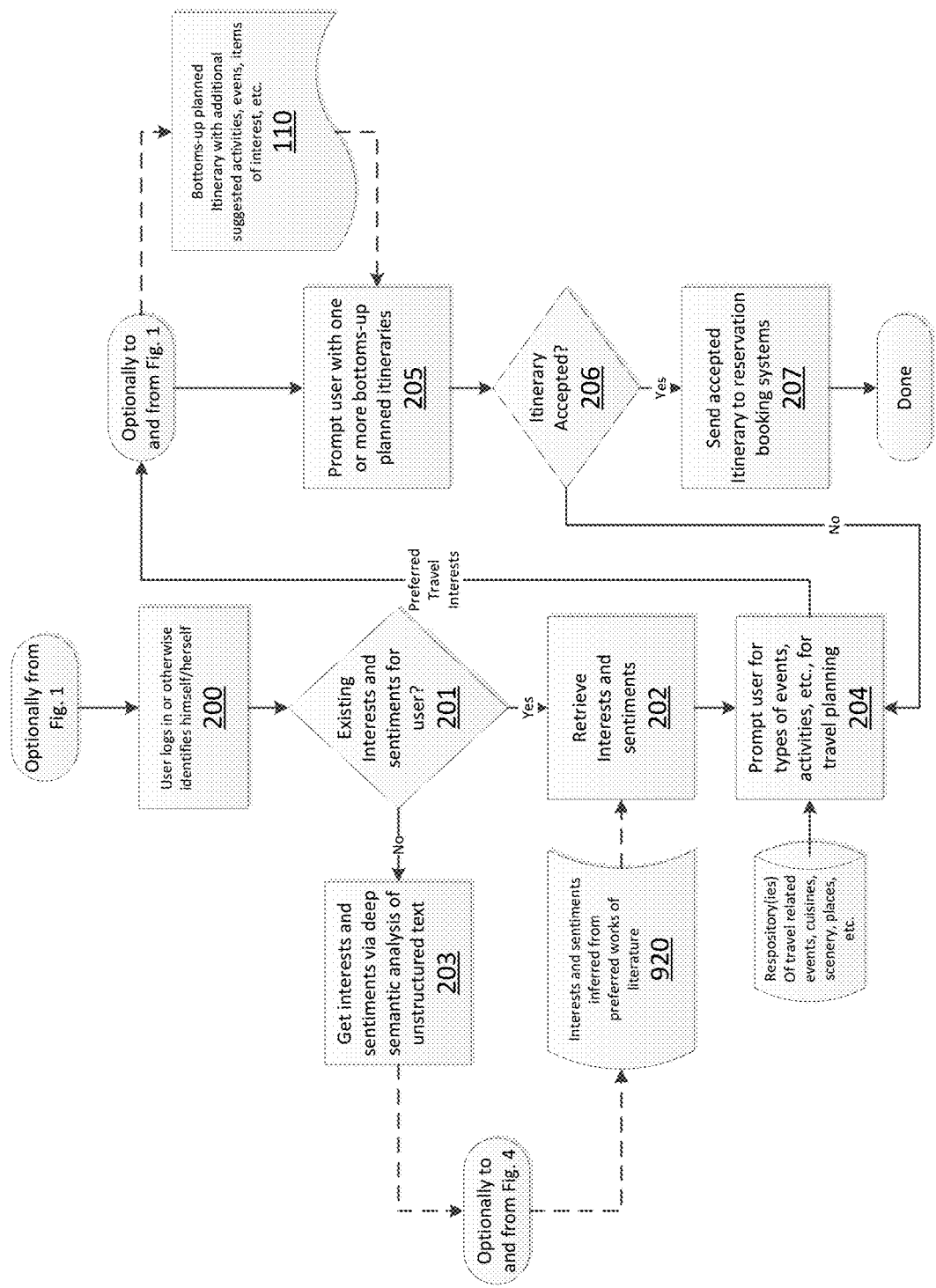
FIG. 2a shows an exemplary logical process for initiating the itinerary generating process from a trip planning session with a user.

User-Initiated Trip Planning. As mentioned in the foregoing paragraphs, one function of at least one available embodiment of the invention is a travel planning tool which is initiated by the user. FIG. 2a illustrates a logical process according to this variation embodiment. After a user initiates (200) a planning session, the system checks (201) to see if there are any existing interests and sentiments known for the user, such as by querying (203) a deep semantic analysis platform for such information (920). In the following description of FIG. 4, more details of one example semantic analysis system will be discussed.

Continuing with reference to FIG. 2a, those interests and sentiments for this user (or for this group of users) are received. Optionally, since this is a user-initiated trip planning session, the user may be prompted (204) to select travel items to be included in the trip plan. Then, the trip itinerary planning process of FIG. 1 may be performed, using the optional user-provided travel item as seed for the searching and clustering steps.

When one or more bottoms-up or micro-first planned itineraries (11) are received, they are proposed (205) to the user for review and approval. If none are accepted by the user, then the process (204-205) may be repeated, such as by using a different user-supplied travel item as a seed. When an itinerary is accepted by the user, then it may be forwarded (207) to a reservation booking system to actual reserve the various items (airfare, train tickets, hotel stays, venue tickets, event registration, etc.).

Figure 2B:
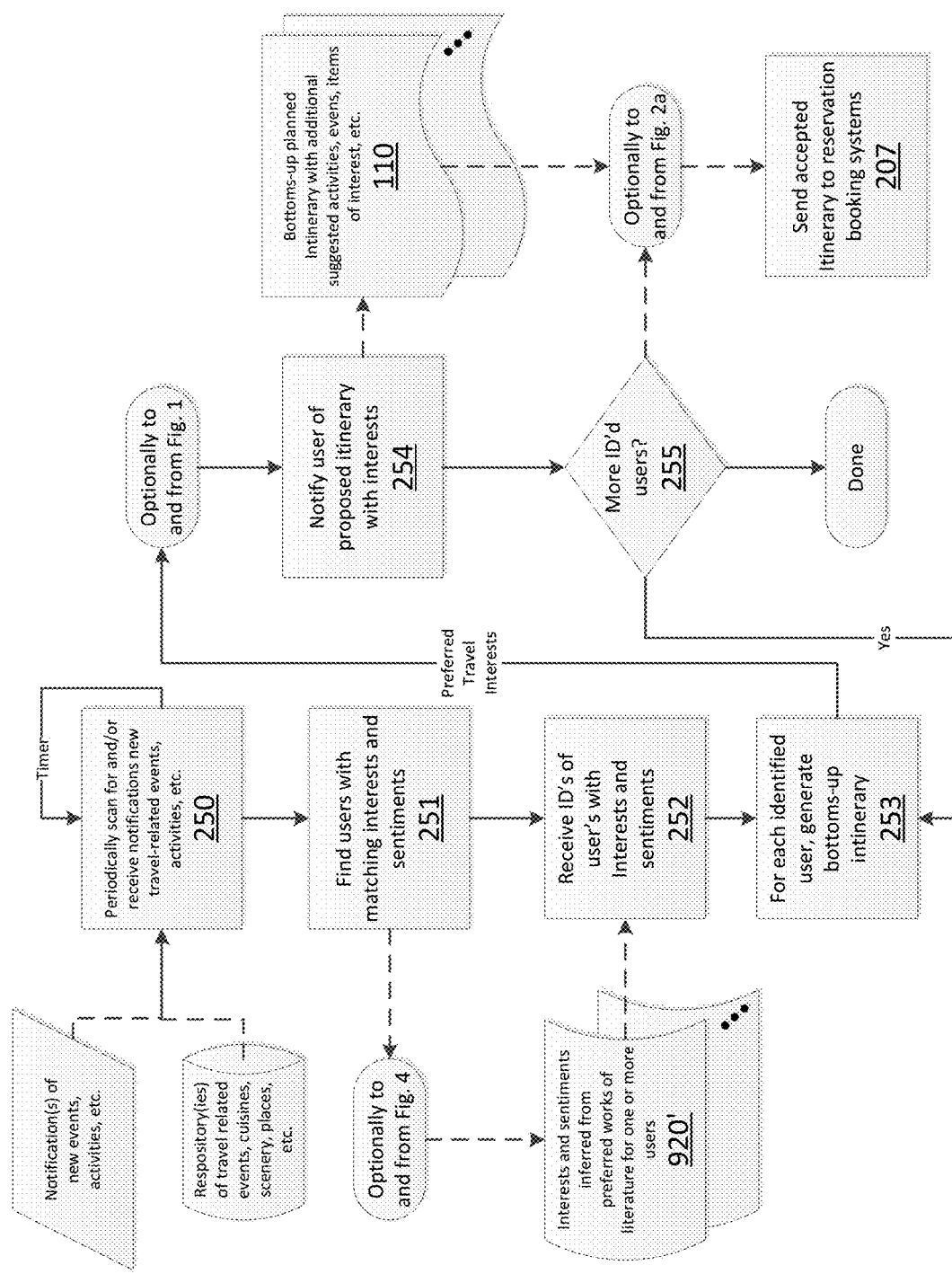
FIG. 2b shows an exemplary logical process for initiating the itinerary generating process on a periodic or event-driven basis, and for notifying potentially users of itineraries that contain travel items of interest.

Advertising and Notification System. As mentioned in the foregoing paragraphs, another embodiment variation according to the present invention is as a pro-active service to notify users of potentially interesting things to do on a proposed trip. Referring now to FIG. 2b, periodically or responsive to receipt of a new notification of an event, activity, or venue, a search (250) for travel items is made. Then, the results of that general search are compared for matches (251) to user interests and sentiments (920'), such as by querying a deep semantic analysis of user-liked literature (e.g., example described in conjunction with FIG. 4).

The identities of users with matching interests and sentiments are received (252), and for each identified user (255), one or more bottom-up, micro-decision-first itineraries are created (253) as described elsewhere herein in conjunction with FIG. 1. The created itineraries (110) are pushed or transmitted (254) to the associated users, such as by email, text messaging, social media messaging and posting, printed mail, and online advertisement placement. Any accepted itineraries are transferred (207) to appropriate trip booking systems and services, as previously described.

Deep Semantic Analysis to Discover (Infer) User Interests and Sentiments

As previously mentioned, embodiments of the present invention preferably engage the services of one or more deep semantic analysis services to analyze the content of unstructured literature, such as novels, magazines, and movie scripts, to infer or discover potential interests and related sentiments of each user. This information is then used to prepare proposed travel itineraries.

The following descriptions of such deep semantic analysis are summarized from the incorporated pending U.S. patent application Ser. Nos. 13/722,017 and 14/094,943 patent applications. Such an example is provided for illustrative purposes only, and is not intended to limit use of embodiments of the present invention with other deep semantic analysis platforms.

Literary Terminology. Terminology used in analysis and criticism of works of literature can be challenging to define in a precise manner. Many commonly used terms are subject to debate by scholars in this field, such as the precise meaning of "plot" or "character". Kathleen Morner and Ralph Rausch have stated in the forward of the NTC's Dictionary of Literary Terms (1998, McGraw-Hill) that such an effort to ascertain the exact meaning of a literary term can be a "vicious circle", wherein terms can be defined with respect to each other. Thus, literary terminology is context-dependent to a significant degree. The terminology used in the present disclosure will be used in a manner consistent with automated analysis of works of text, and in a manner which lends itself to computer and software design.

Deep Semantic Analysis of Natural Language Text in General. For the purposes of the present disclosure, the term "deep semantic" relationships, is meant to refer to relationships between information entities in a given context and how they relate to each other. They can be the occurrence of triple store terms or entities or they can be the occurrence with a relationship of those entities. For example, (Mutation, Cancer, Organ) would be a semantic relationship, identifying that mutations, cancer and specific organ ontologies have a deep relationship. Further, a deep semantic analysis system sometimes associates a specific relationship (mass, ?indicates, metastasis), where the combination and synonyms for "indicates" would mean the cancer has metastasized.

The term deep semantic relationship may also refer to the relationship of terms in a specific ontology and their similarity when expressed in passages of text based on the how they are typically expressed using sequence matching algorithms for text analysis. For example, the well-known Smith-Waterman sequence-matching algorithm measures the lengths of the longest similar subsequence between two texts, which is then a measured or detected semantic relationship between those texts.

Deep semantic relationships consider the meaning of words within the context and structure of a sentence. They signify a "deep" understanding the meaning of words that comprise a relationship within the sentence. Deep semantic relationships are usually developed with a very specific use case in mind. For example, consider the sentence "John bought bread at the store." From this, a relationship like sold (store, bread) may be mined, indicating that the store sold bread. This relationship requires a deep understanding of what a store is (a retailer that sells consumable goods) and that bread is one of those items.

For example, one "specific use" in which deep semantic analysis has been proposed is the deep semantic interpretations of legal texts as proposed by L. Thorne McCarty of Rutgers University (Association of Computer Machinery (ACM), 971-1-59593-680). Another useful publicly-available document regarding realization of a general purpose automatic deep semantic analyzer of natural language text is described in "Deep Semantic Analysis of Text" by James F. Allen, et al., of the University of Rochester and the Institute for Human and Machine Cognition (document W08-0227 from the ACL).

So, while deep semantic analysis of natural language text in general has been discussed in the public domain, the inventors have discovered the unsatisfied problem set forth herein. One approach to advancing beyond keyword searching is "intent-centric" processing as proposed by Scott Brave, et al., in WIPO patent application WO 2009/021198 A1. Inventors do not believe this approach, however solves the presently addressed problem, as will be evident by the following paragraphs.

The present invention is set forth in at least one exemplary embodiment as an application of or manner of using a deep semantic analyzer platform. This platform may be a system such as the IBM Watson™ system, such as is described in "Building Watson: An Overview of the DeepQA Project" (Stanford University online, and AI Magazine, Fall 2010 issue). The foundation deep semantic analysis platform may be an alternate general-purpose deep semantic analyzer implementation such as the semantic extraction component of the system described by Anna Stavrianou in United States Pre-Grant Published Patent Application 2013/0218914 A1 (Aug. 22, 2013) suitably modified to include the functionality of the related, incorporated patent application and that described herein by the present inventors. Other useful, publicly-available teachings regarding the availability of general purpose deep semantic analyzers which may be suitable for adapting and improving to the present invention may include those described by Konstantin Zuev in United States Pre-Grant Published Patent Application 2011/0270607 A1 (Nov. 3, 2011); the Thompson's Motif-Index Literature system of Thiery Declerk, et al., as published in "Research and Advanced Technology for Digital Libraries: Lecture Notes in Computer Science", vol. 6966, 2011, pp. 151-158; and using natural language parsers such as that described by Sala Ait-Mokhtar, et al., in U.S. Pat. No. 7,058,567 (Jun. 6, 2006).

One may contrast deep semantic relationships with shallow semantic relationships, that latter of which usually only consider the structure of parts of speech within a sentence, and not necessarily the meanings of those words. An example shallow relationship may simply be of the form sentence (subject, verb, object). In the above example, this would be sentence (john, bought, bread). These terms don't signify any special meaning, but their parts of speech form a shallow relationship called "sentence".

Graphical logical forms for representation of text can be created using one of several known methods, such as that proposed by James F. Allen, Mary Swift, and Will de Beaumont, of the University of Rochester and the Institute for Human and Machine Cognition (Association for Computer Linguistics (ACL), anthology document W08-2227).

Overview of the Processes Incorporated from Pending U.S. patent application Ser. Nos. 13/722,017 and 14/094,943. For the purposes of this disclosure, we will use the term "literary element" to refer to elements such as humor, mystery, drama, change of scenery or locale, romance, etc. According to this and related inventions, such literary elements are identified, quantified and qualified, such as by type (e.g. humor type: sarcasm, malapropism, pun, etc.) and by strength or weight.

A core idea of this disclosed invention was to utilize raw data indicating literary elements within a digital work of literature, their concentration clusters, and their relative weight (or significance) throughout a particular work of literature to find a similar matching patterns across another works of literature, and to be further used to determine similarity of content, or the make-up of key literary elements throughout the entire literary content. Such a tool may find utility in a number of applications, such as the present invention's use of this information to prepare travel itineraries.

Figure 4:
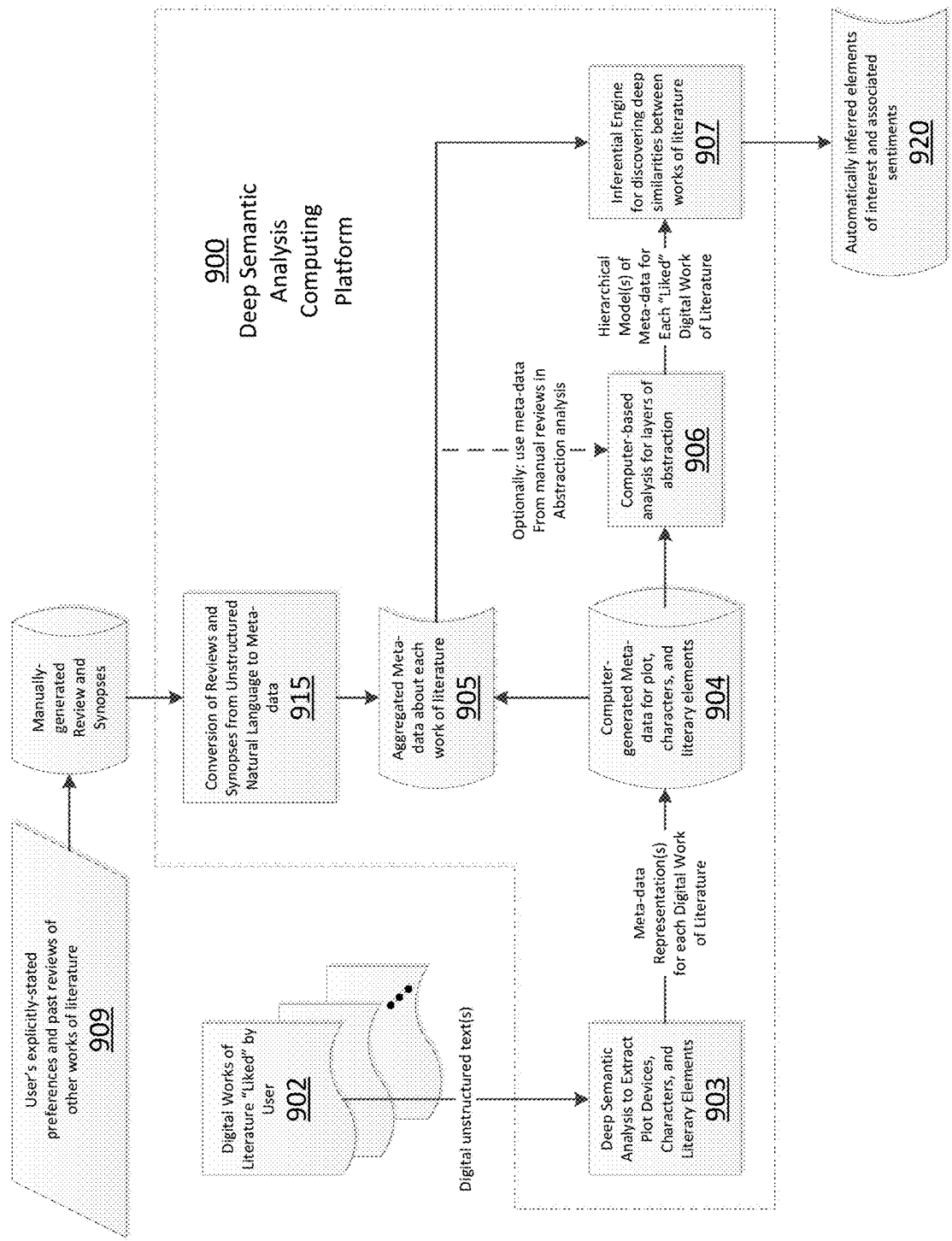
FIG. 4 depicts generalized logical process for performing deep semantic analysis on a plurality of digital works of literature to infer interests and sentiments according to user "likes" and comments.

Turning to FIG. 4, such an arrangement of components and elements of an available deep semantic analysis system is shown. A work of literature (902) previously "liked" or about which the user has commented (positively or negatively) is subjected to deep semantic analysis to extract characters, their relationships to each other and plot events, as well as other literary elements such as elements (and significance or intensity) of humor, mystery, drama, scenery, etc.

Meta-data representing the results of this analysis is stored (904), and optionally aggregated (905) with meta-data which is converted from manually-created descriptions of the works of literature, such as reviews, Cliff™ notes, condensed versions of the works, etc., which may include reviews authored by the user and authored by others.

In one manner of using this meta-data, the meta-data may be further analyzed and organized (906) into hierarchical layers of abstraction to allow ready comparison with other works of literature via their abstracted meta-data representations to enable determination of similarities with other works of literature which the user has "liked" or posted comments.

The deep semantic analysis system then uses the abstracted modeling process by an inferential engine (907) to discover deep similarities between two or more works of literature, and to yield one or more user interests and sentiments (920). For example, a first user's interests may be inferred as (rock climbing, strong positive), (religion, moderate negative), (spy stories, moderate positive), (art, strong negative), as extracted from similarities between several novels, magazines and movies "liked" or commented about by the user. As such, a trip itinerary created by methods according to the present invention would seek to allow for rock climbing opportunities and locations or museums about spies, while avoiding itinerary items related to historical churches or temples and avoiding art museums or exhibits.

Figure 5:
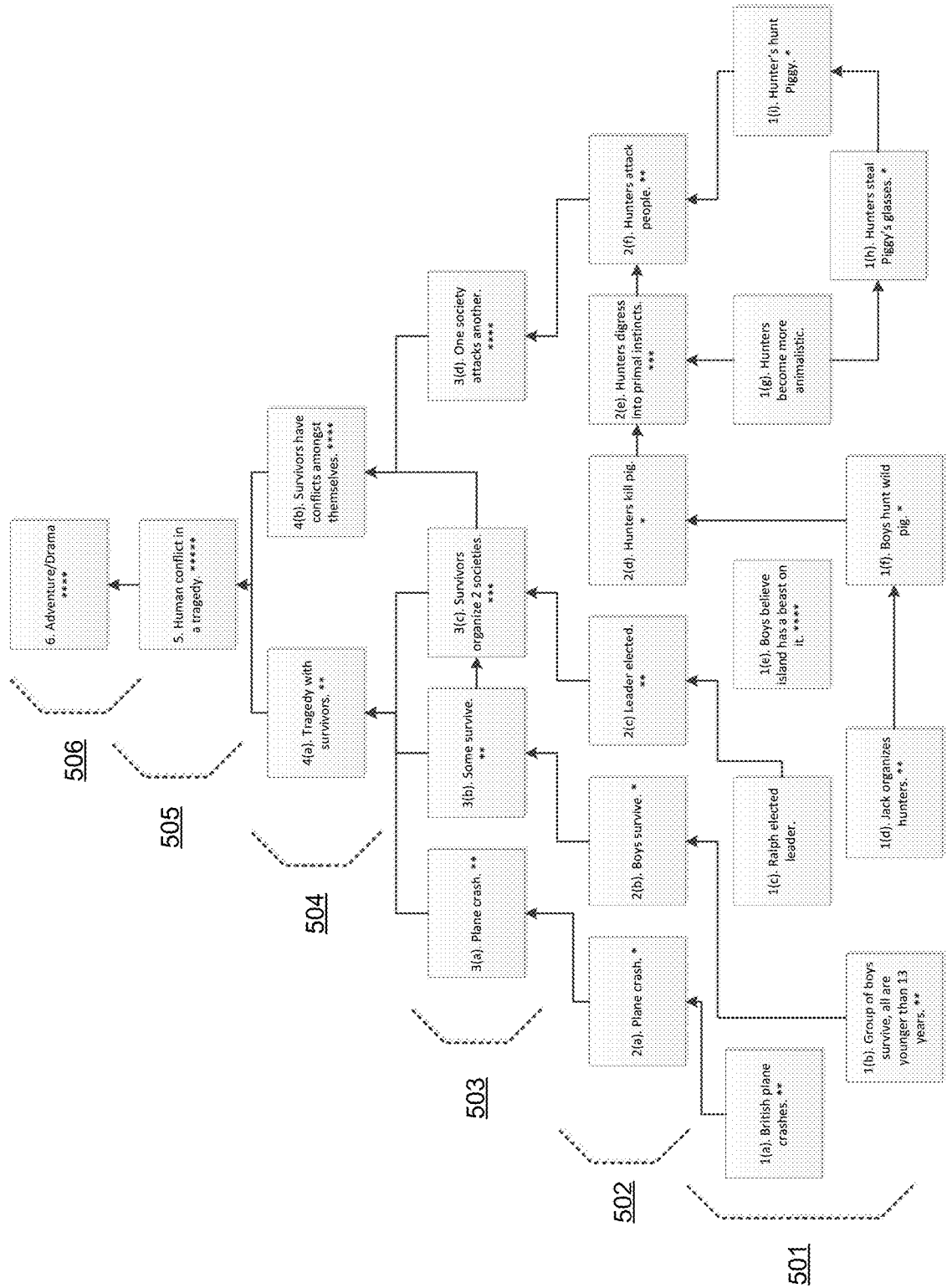
FIG. 5 provides an illustration of a multi-layer abstraction model, which can be encoded in a data structure suitable for use by an automated process to compare to other models of other literary works.
Figure 6:
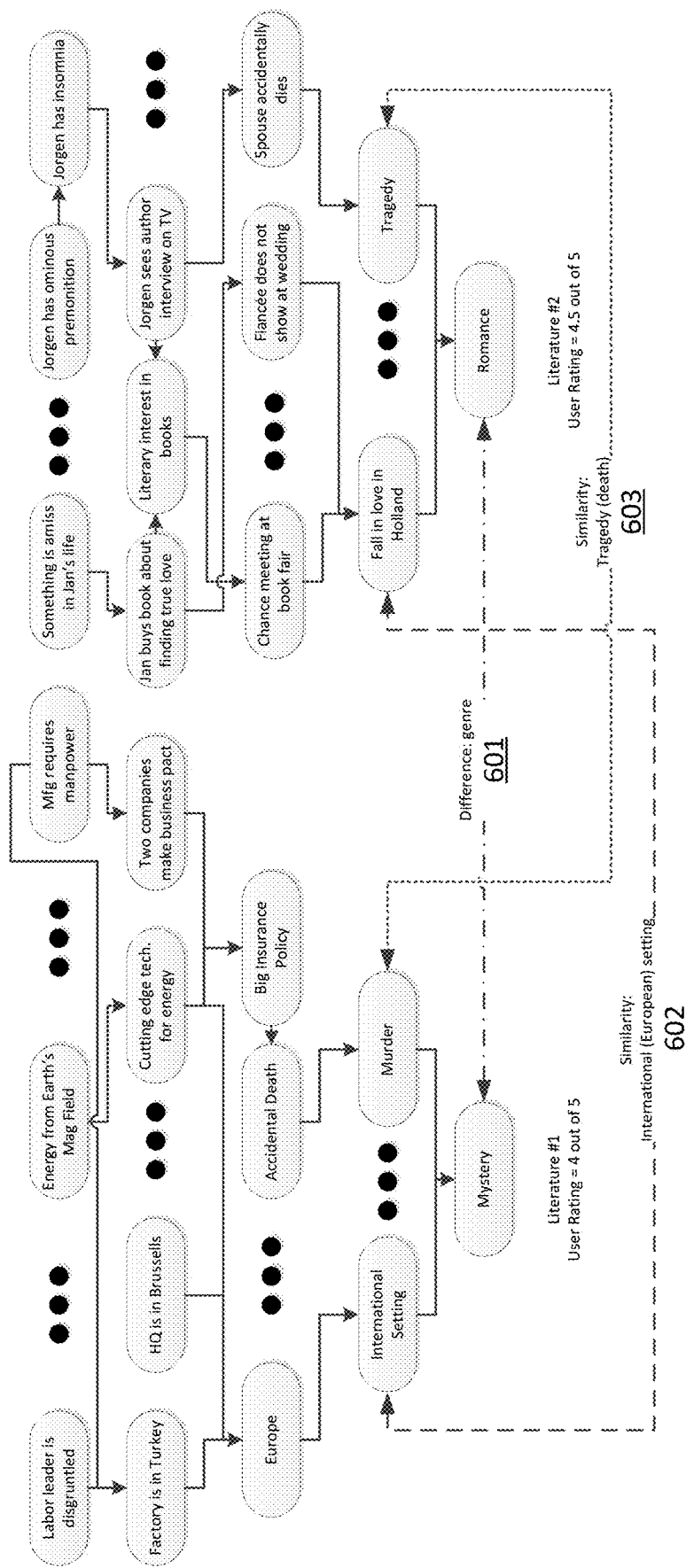
FIG. 6 depicts a comparison of two models of two different literary works as performed in at least one embodiment of the invention to find similarities and differences which may be inferred as interests by a user who prefers the two literary works.

This particular example of a deep semantic analysis process utilizes hierarchical layers of abstract models for each of the different literary works, such as illustrated in FIGS. 5 and 6. FIG. 5 illustrates a semantic model of abstraction of an entire novel. This model representation shows multiple levels of abstraction (501, 502, 503, 504, 505, and 506) which lead to a root level (e.g. the greatest level of abstraction), such as a genre for a novel. Each item is denoted by a layer number N followed by an item ordinal letter (x) in the format of N(x), and a user rating is shown in stars (4 stars being a highly rated item, 1 star being a lowly rated item).

The relationship lines of FIG. 5 are provided to assist the reader in understanding how each item in each layer relates to or leads to one or more items in the next, more abstract layer. Those ordinarily skilled in the art will recognize that the results of semantic analysis are not always two dimensional or planar as shown here, but the illustration is useful for understanding the relationships between items and layers.

Each item of the multi-layer abstraction model can be represented by a set of attributes as follows, which is conducive to representation in database records, for example:

[<user_rating>-<node>-<level>]

where <user_rating> is a representation of the user's rating (e.g. number of stars, etc.), <node> is the item identifier within a layer (e.g. the ordinal letter of FIG. 5), and <level> is the abstraction layer (e.g. could be absolute such as 1, 2, 3, 4, etc., or relative such as +1, +2, +3, etc.).

Such a notation system can also be captured in an XML-like structure, such as:

```
<literary_work_model>
    <abstraction_model_item>
        <description>string</description>
        <user_rating>****</user_rating>
        <node>x</node>
        <level>N</level>
    </abstraction_model_item>
    . . .
</literary_work_model>
```

In such an XML model, the third level (503) of abstraction of the model shown in FIG. 5 would be captured as follows:

```
<literary_work_model>
    <abstraction_model_item>
        <level>3</level>
        <node>a</node>
        <description>"plane crash"</description>
        <user_rating>**</user_rating>
    </abstraction_model_item>
    <abstraction_model_item>
        <level>3</level>
        <node>b</node>
        <description>"some survive"</description>
        <user_rating>**</user_rating>
    </abstraction_model_item>
    <abstraction_model_item>
        <level>3</level>
        <node>c</node>
        <description>"survivors organized into 2 societies"</description>
        <user_rating>***</user_rating>
    </abstraction_model_item>
    <abstraction_model_item>
        <level>3</level>
        <node>d</node>
        <description>"one society attacks anohter"</description>
        <user_rating>****</user_rating>
    </abstraction_model_item>
</literary_work_model>
```

In such a data structure representing the results of the deep semantic analysis of a literary work, the processes according to the present invention are enabled to compare models of different literary works, and to detect similarities between various levels and items within levels to determine alternative literary works which may be of interest to the user based on the user's prior ratings and prior consumption of literary works.

The following pseudo-code process is provided to the reader for a high-level example of at least one embodiment of a logical process:
1. System ingests the electronic literature in its entirety, optionally in part.
2. System runs a series of annotators to extract semantic relationships from text.
    a. Both deep and shallow semantic relations are detected.
    b. Deep semantic relationship captures atomic event of interest, such as "Ralph blows the conch".
3. The system repeats semantic analysis on the annotations made in the previous iteration.
    a. For consistency, the annotations may be translated to plain-text for consistent processing.
    b. Each iteration of semantic analysis becomes more generalized, thereby encompassing a broader set of annotations.
4. The process repeats until no further generalization is possible (e.g. the literature's genre is reached).
5. Methods to detect pertinent information/annotations may be employed.

Referring now to FIG. 6, two abstraction models for two different literary works are graphically compared in order to detect deep semantic similarities (602) which even the user may not realize exist. As those skilled in the art will recognize, this graphical depiction is for the reader's understanding, but in practice, such a model can be represented in a construct of database records without such a graphical representation but in a manner which is machine readable and machine useable. Both models represent literary works which are highly rated overall by a user. On the left, a model for a hypothetical mystery is shown, and on the right, a hypothetical model for a romance novel is shown. One can see that there is a difference (601) in the genre, so based on just analyzing these two models, it is inconclusive whether the user prefers or not mysteries or romance. However, a bit of a pattern emerges through the similarities of an international setting (possibly even more specifically a European setting), and the similarity of a tragedy (possibly even more specifically an untimely death).

Extending on this analysis and comparison, the more works that are added to the analysis with a greater range of user ratings (strong like to strong dislike), the greater the precision of common elements can be inferred. If, for example, after considering twenty rated literary pieces it is found that of thirteen which are highly rated, nine of them are set in Europe, then a strong preference for literary works set in Europe can be inferred. And, if only three of the highly-rated works involve tragedy and untimely death, then a weak to neutral preference for this plot element can be inferred. If, out of the twenty considered only four are lowly-rated and three of those deal with political themes, then a weak dislike can be inferred from that pattern.

These comparisons, whether they are rendered to a graphical state or not, are useful in the enhanced recommendation engine which incorporates the cluster analysis as described in the following paragraphs. As such, the user ratings, inferred user preferences and dislikes, and explicit user preferences and dislikes can be combined and coalesced with the clusters found in multiple different works of literature to drive an enhanced recommendation engine as described next.

Computer Program Product Embodiments

As will be appreciated by one skilled in the art, aspects of the present invention may be embodied as a system, method or computer program product. Accordingly, aspects of the present invention may take the form of an embodiment combining software and hardware that may all generally be referred to herein as a "circuit," "module" or "system." Furthermore, aspects of the present invention may take the form of a computer program product embodied in one or more computer readable memory devices having computer readable program code embodied thereon.

Any combination of one or more computer readable device(s), for example, but not limited to, an electronic, magnetic, optical, electromagnetic, infrared, or semiconductor system, apparatus, or device, or any suitable combination of the foregoing. More specific examples (a non-exhaustive list) would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage memory device may be any tangible memory device that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory device that can direct a computer, other programmable data processing apparatus, or other devices to function in a particular manner, such that the instructions stored in the computer readable memory device produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the logical processes shown and disclosed herein.

Suitable Computing Platform

The preceding paragraphs have set forth example logical processes according to the present invention, which, when coupled with processing hardware, embody systems according to the present invention, and which, when coupled with tangible, computer readable memory devices, embody computer program products according to the related invention.

Regarding computers for executing the logical processes set forth herein, it will be readily recognized by those skilled in the art that a variety of computers are suitable and will become suitable as memory, processing, and communications capacities of computers and portable devices increases. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 3:
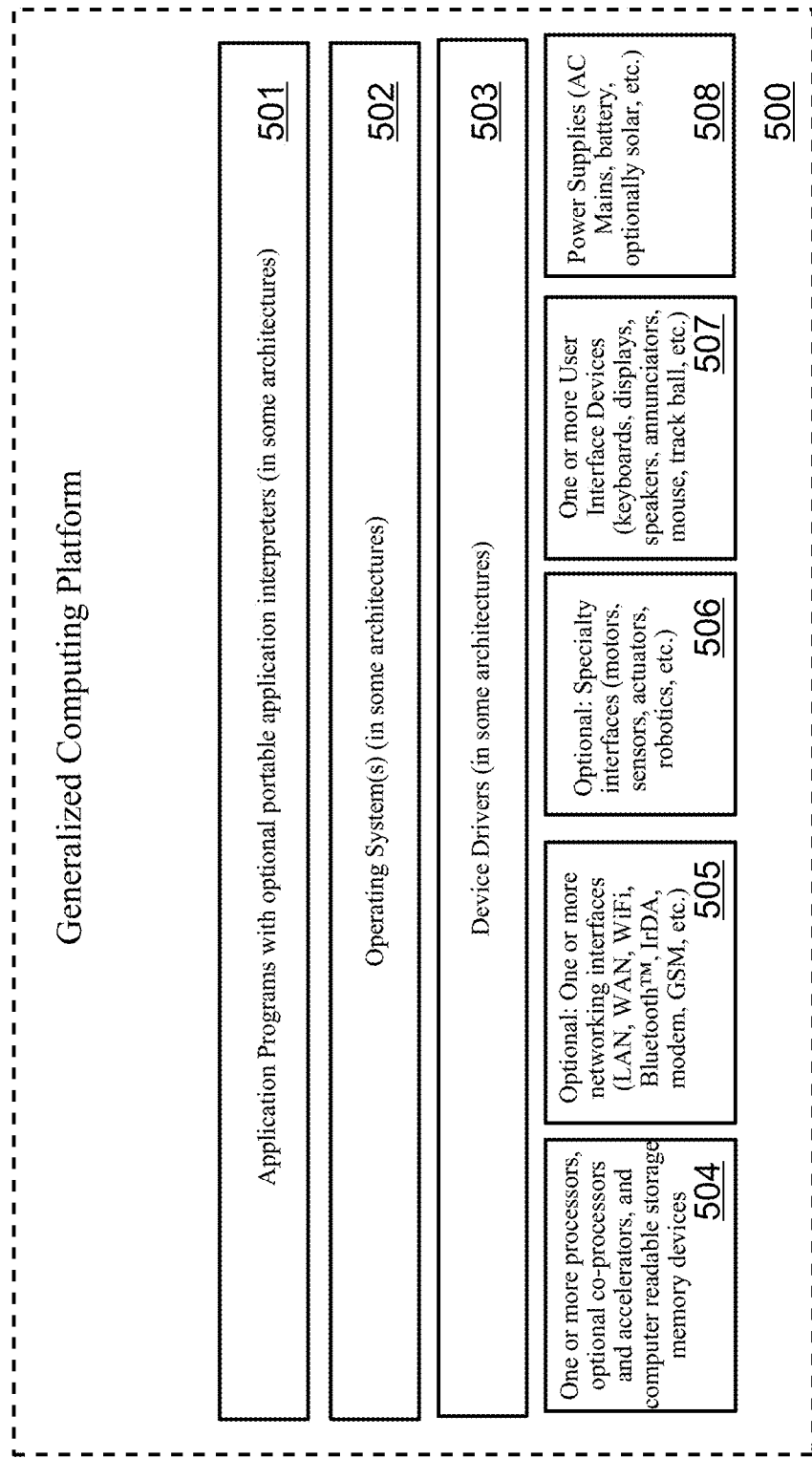
FIG. 3 illustrates a generalized computing platform suitable for combination with program instructions to perform a logical process such as shown in FIG. 3 to yield a computer system embodiment according to the present invention.

The present invention may be realized for many different processors used in many different computing platforms. FIG. 3 illustrates a generalized computing platform (500), such as common and well-known computing platforms such as "Personal Computers", web servers such as an IBM iSeries™ server, and portable devices such as personal digital assistants and smart phones, running a popular operating systems (502) such as Microsoft™ Windows™ or IBM™ AIX™, UNIX, LINUX, Google Android™, Apple iOS™, and others, may be employed to execute one or more application programs to accomplish the computerized methods described herein. Whereas these computing platforms and operating systems are well known an openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (501) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (504) accompanied by, sometimes, specialized co-processors or accelerators, such as graphics accelerators, and by suitable computer readable memory devices (RAM, ROM, disk drives, removable memory cards, etc.). Depending on the computing platform, one or more network interfaces (505) may be provided, as well as specialty interfaces for specific applications. If the computing platform is intended to interact with human users, it is provided with one or more user interface devices (507), such as display(s), keyboards, pointing devices, speakers, etc. And, each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It should also be recognized by those skilled in the art that certain embodiments utilizing a microprocessor executing a logical process may also be realized through customized electronic circuitry performing the same logical process(es).

It will be readily recognized by those skilled in the art that the foregoing example embodiments do not define the extent or scope of the present invention, but instead are provided as illustrations of how to make and use at least one embodiment of the invention. The following claims define the extent and scope of at least one invention disclosed herein.

What is claimed is:

1. A method for preparing travel itineraries comprising:
    prior to receiving, by a computer, from a user via a user interface device, an explicit macro-decision regarding a travel itinerary destination, or a travel time frame, or both:
    receiving, by a computer, from a deep semantic inferencing platform, one or more inferenced interests and associated inferenced sentiment levels of a user, of a plurality of literary elements from one or more digital works of literature, based on common characteristics of the literary elements and frequency of consumption of the one or more digital works of literature by the user;
    searching, by the computer, one or more repositories of travel items matching interests and associated sentiment levels of the user, based on the inferences of the plurality of literary elements and frequency of consumption of the one or more digital works of literature by the user;
    arranging, by the computer, the matching travel items which exceed a threshold sentiment level into a plurality of alternative travel itineraries, wherein the plurality of alternative itineraries are based on randomization with restarts, seeded by one or more of the travel items which exceed the threshold sentiment level as a starting point for each of the plurality of alternative travel itineraries;
    scoring, by the computer, each of the plurality of alternative travel itineraries by accumulating inferenced sentiment levels for each travel item associated with each of the plurality of alternative travel itineraries; and
    providing, by the computer, the scored alternative travel itineraries which exceed an accumulated inferenced sentiment value threshold.

2. The method as set forth in claim 1 wherein the steps are performed responsive to a user-initiated travel planning session.

3. The method as set forth in claim 2 wherein the user-initiated travel planning session comprises collecting by the computer at least one user-supplied travel item, and wherein the searching and preparing use the user-supplied travel item as a process seed.

4. The method as set forth in claim 1 wherein the steps are performed responsive to at least one event selected from the group consisting of receiving notification by the computer of a newly-available travel item, and searching by the computer for newly-available travel items responsive to a timer expiration.

5. The method as set forth in claim 1 further comprising:
    receiving, by the computer, from the user via the user interface device, an acceptance of at least one prepared itinerary; and
    transmitting by the computer the accepted itinerary to a travel booking system.

6. A computer program product for preparing travel itineraries comprising:
    a tangible, computer-readable storage memory device which is not a propagating signal, per se; and
    program instructions embodied by the tangible, computer-readable storage memory device, for causing a computer processor, prior to receiving, by a computer, from a user via a user interface device, an explicit macro-decision regarding a travel itinerary destination, to perform operations comprising:
    receiving from a deep semantic inferencing platform, one or more inferenced interests and associated inferenced sentiment levels of a user of a plurality of literary elements from one or more digital works of literature based on common characteristics of the literary elements and frequency of consumption of the one or more digital works of literature by the user;
    searching one or more repositories of travel items matching interests and associated sentiment levels of the user, based on the inferences of the plurality of literary elements and frequency of consumption of the one or more digital works of literature by the user;
    arranging, the matching travel items which exceed a threshold sentiment level into a plurality of alternative travel itineraries, wherein plurality of alternative itineraries are based on randomization with restarts, seeded by one or more of the travel items which exceed the threshold sentiment level as a starting point for each of the plurality of alternative travel itineraries;
    scoring each of the plurality of alternative travel itineraries by accumulating inferenced sentiment levels for each travel item associated with each of the plurality of alternative travel itineraries; and
    providing the scored alternative travel itineraries which exceed an accumulated inferenced sentiment value threshold.

7. The computer program product as set forth in claim 6 wherein the program instructions are performed responsive to a user-initiated travel planning session.

8. The computer program product as set forth in claim 7 wherein the program instructions responsive to a user-initiated travel planning session comprise program instructions for collecting at least one user-supplied travel item, and wherein the searching and preparing use the user-supplied travel item as a process seed.

9. The computer program product as set forth in claim 6 wherein the program instructions are performed responsive to at least one event selected from the group consisting of receiving notification of a newly-available travel item, and searching for newly-available travel items responsive to a timer expiration.

10. The computer program product set forth in claim 6 further comprising program instructions embodied by the tangible, computer-readable storage memory device for causing the processor to perform operations comprising:
receiving, from the user via the user interface device, an acceptance of at least one prepared itinerary; and
transmitting the accepted itinerary to a travel booking system.

11. A system for preparing travel itineraries comprising:
a computer processor for performing operations under the control of program instructions;
a tangible, computer-readable storage memory device which is not a propagating signal per se; and
program instructions embodied by the tangible, computer-readable storage memory device, for causing a computer processor, prior to receiving, by a computer, from a user via a user interface device, an explicit macro-decision regarding a travel itinerary destination, to perform operations comprising:
receiving from a deep semantic inferencing platform, one or more inferenced interests and associated inferenced sentiment levels of a user of a plurality of literary elements from one or more digital works of literature, based on common characteristics of the literary elements and frequency of consumption of the one or more digital works of literature by the user;
searching one or more repositories of travel items matching interests and associated sentiment levels of the user, based on the inferences of the plurality of literary elements and frequency of consumption of the one or more digital works of literature by the user;
arranging the matching travel items which exceed threshold sentiment level into a plurality of alternative travel itineraries, wherein plurality of alternative itineraries are based on randomization with restarts, seeded by one or more of the travel items which exceed the threshold sentiment level as a starting point for each of the plurality of alternative travel itineraries;
scoring each of the plurality of alternative travel itineraries by accumulating inferenced sentiment levels for each travel item associated with each of the plurality of alternative travel itineraries; and
providing the scored alternative travel itineraries which exceed an accumulated inferenced sentiment value threshold.

12. The system as set forth in claim 11 wherein the program instructions are performed responsive to a user-initiated travel planning session.

13. The system as set forth in claim 12 wherein the program instructions responsive to a user-initiated travel planning session comprise program instructions for collecting at least one user-supplied travel item, and wherein the searching and preparing use the user-supplied travel item as a process seed.

14. The system as set forth in claim 11 wherein the program instructions are performed responsive to at least one event selected from the group consisting of receiving notification of a newly-available travel item, and searching for newly-available travel items responsive to a timer expiration.

15. The system as set forth in claim 11 further comprising:
program instructions embodied by the tangible, computer-readable storage memory device for causing the processor to perform operations comprising:
receiving, from the user via the user interface device, an acceptance of at least one prepared itinerary; and
transmitting the accepted itinerary to a travel booking system.

* * * * *